US012244693B2

United States Patent
Fox-Epstein et al.

(10) Patent No.: US 12,244,693 B2
(45) Date of Patent: Mar. 4, 2025

(54) MULTI-KEY INFORMATION RETRIEVAL

(71) Applicant: Google LLC, Mountain View, CA (US)

(72) Inventors: Eli Simon Fox-Epstein, Los Angeles, CA (US); Craig William Wright, Louisville, CO (US); Kevin Wei Li Yeo, New York City, NY (US); Mariana Raykova, New York City, NY (US); Karn Seth, New York City, NY (US)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 17/926,238

(22) PCT Filed: Oct. 19, 2021

(86) PCT No.: PCT/US2021/055514
§ 371 (c)(1),
(2) Date: Nov. 18, 2022

(87) PCT Pub. No.: WO2023/069072
PCT Pub. Date: Apr. 27, 2023

(65) Prior Publication Data
US 2023/0318809 A1   Oct. 5, 2023

(51) Int. Cl.
*H04L 9/08* (2006.01)
(52) U.S. Cl.
CPC .......... *H04L 9/0825* (2013.01); *H04L 9/0866* (2013.01)
(58) Field of Classification Search
CPC .............. H04L 9/0825; H04L 9/0866
See application file for complete search history.

(56) References Cited

U.S. PATENT DOCUMENTS

| 6,987,853 | B2 * | 1/2006 | Uner | H04L 9/083 380/46 |
| 9,942,044 | B2 * | 4/2018 | Sullivan | G06F 21/6209 |

(Continued)

FOREIGN PATENT DOCUMENTS

| JP | 2012-128398 | 7/2012 |
| WO | WO 2022266071 | 12/2022 |

OTHER PUBLICATIONS

Ali et al., "Communication-Computation Trade-offs in PIR." IACR Cryptol. ePrint Arch. Dec. 2019, 21 pages.
(Continued)

*Primary Examiner* — Shahriar Zarrineh
*Assistant Examiner* — Gita Faramarzi
(74) *Attorney, Agent, or Firm* — Fish & Richardson P.C.

(57) ABSTRACT

Methods, systems, and apparatus, including computer programs encoded on a computer storage medium for retrieving information from a server. Methods can include a server receiving a set of client-encrypted queries. The server identifies a set of server-encrypted decryption keys and transmits the set to the client device. The server receives a set of client-server-encrypted decryption keys that includes the set of server-encrypted decryption keys encrypted by the client device. The server also receives a set of client-encrypted/client-derived decryption keys that were derived by the client device. The server generates matching a map that specifies matches between the set of client-server-encrypted decryption keys and the set of client-encrypted/client-derived decryption keys. The server filters the set of client-encrypted queries using the map to create a set of filtered client-encrypted queries and generates a set of query results.

20 Claims, 7 Drawing Sheets

(56) References Cited

U.S. PATENT DOCUMENTS

| | | | | |
|---|---|---|---|---|
| 10,210,266 | B2* | 2/2019 | Antonopoulos | G06F 16/2282 |
| 10,360,397 | B2* | 7/2019 | Gupta | H04L 9/0894 |
| 10,491,373 | B2* | 11/2019 | Jain | H04L 9/008 |
| 10,586,057 | B2* | 3/2020 | Keselman | G06F 21/6227 |
| 10,691,754 | B1* | 6/2020 | El Defrawy | H04L 63/0428 |
| 2016/0344707 | A1* | 11/2016 | Philipp | H04L 63/06 |
| 2018/0212756 | A1* | 7/2018 | Carr | H04L 9/008 |
| 2020/0342118 | A1* | 10/2020 | Yeo | H04L 9/0894 |

OTHER PUBLICATIONS

Brakerski et al., "Fully homomorphic encryption from ring-LWE and security for key dependent messages." Advances in Cryptology—CRYPTO 2011: 31st Annual Cryptology Conference, Santa Barbara, CA, USA, Aug. 14-18, 2011. Proceedings 31. Springer Berlin Heidelberg, Aug. 2011, 20 pages.

Brakerski et al., "Fully Homomorphic Encryption without Bootstrapping." Cryptology ePrint Archive, May 2011, 27 pages.

Github.com [online], "Shell-Encryption" Sep. 2017, retrieved on Jan. 26, 2023, retrieved from URL <https://github.com/google/shell-encryption>, 8 pages.

International Search Report and Written Opinion in International Appln. No. PCT/US2021/055514, mailed on Jul. 13, 2022, 15 pages.

Microsoft.com [online], "Microsoft Seal" Feb. 2019, retrieved on Jan. 26, 2023, retrieved from URL <https://www.microsoft.com/en-us/research/project/microsoft-seal/>, 2 pages.

Notice of Allowance in European Appln. No. 21806894.8, dated May 25, 2023, 9 pages.

Office Action in Japanese Appln. No. 2022-565671, mailed on Nov. 27, 2023, 6 pages (with English translation).

Notice of Allowance in Japanese Appln. No. 2022-565671, mailed on Jan. 22, 2024, 5 pages (with English translation).

Extended European Search Report in European Appln. No. 23202858.9, mailed on Jan. 23, 2024, 6 pages.

International Preliminary Report on Patentability in International Appln. No. PCT/US2021/055514, mailed on May 2, 2024, 8 pages.

\* cited by examiner

MULTI-KEY INFORMATION RETRIEVAL

CROSS-REFERENCE TO RELATED APPLICATIONS

This application is a National Stage Application under 35 U.S.C. § 371 and claims the benefit of International Application No. PCT/US2021/055514, filed Oct. 19, 2021, the entirety of which is incorporated herein by reference.

BACKGROUND

This specification relates to data processing and information retrieval.

User devices and content platforms such as content distributors can query content providers in order to retrieve information stored by the content providers. However, there can be situations when it is not in the interest of the content platforms to reveal any details to the content providers about what information is being queried. In other situations, it may not be in the interest of the content providers to reveal any details to the content platforms about other information that is stored on the computing systems of the content providers.

SUMMARY

In general, one innovative aspect of the subject matter described in this specification can be embodied in methods including the operations of receiving, by a server including one or more processors and from a client device, a set of client-encrypted queries that were encrypted by the client device; identifying, by the server, a set of server-encrypted decryption keys based on the set of client-encrypted queries; transmitting, by the server, the set of server-encrypted decryption keys to the client device; receiving, by the server and from the client device, a set of client-server-encrypted decryption keys that includes the set of server-encrypted decryption keys that have been further encrypted by the client device; receiving, by the server and from the client device, a set of client-encrypted/client-derived decryption keys that (i) were derived by the client device independent of the set of server-encrypted decryption keys, and (ii) are encrypted by the client device; generating, by the server, a matching decryption key map that specifies matches between (i) the set of client-server-encrypted decryption keys and (ii) the set of client-encrypted/client-derived decryption keys; filtering, by the server, the set of client-encrypted queries using the matching decryption key map to create a set of filtered client-encrypted queries; and generating, by the server, a set of query results using the set of filtered client-encrypted queries.

Other embodiments of this aspect include corresponding methods, apparatus, and computer programs, configured to perform the actions of the methods, encoded on computer storage devices. These and other embodiments can each optionally include one or more of the following features.

Methods can further include receiving, from the client device, a set of client-encrypted entity identifiers; encrypting, by the server, the set of client-encrypted entity identifiers to create a set of sever-client-encrypted identifiers; transmitting, by the server, the set of server-client-encrypted identifiers to the client device.

Methods can include generating, by the client device, a set of queries using the set of server-client-encrypted identifiers; generating, by the client device, a set of decryption keys using the set of server-client-encrypted identifiers; encrypting, by the client device, the set of queries to create the client-encrypted queries.

Methods can include encrypting, by the server, a set of data stored in a database, wherein, for a plurality of entries in the database, each database entry is server-encrypted and is capable of being decrypted by a corresponding decryption key; encrypting, by the server, each corresponding decryption key for the plurality of entries in the database; creating, by the server, the set of server-encrypted decryption keys based on database bucket identifiers included in the client-encrypted queries, wherein the set of server-encrypted decryption keys includes the server-encrypted decryption key for each database entry corresponding to the bucket identifiers included in the client-encrypted queries.

Methods can include generating a matching decryption key map by removing the server encryption from the set of client-server-encrypted decryption keys resulting in a recovered set of client-encrypted decryption keys that includes client-encrypted versions of each corresponding decryption key for each database entry corresponding to the bucket identifiers included in the client-encrypted queries; comparing, by the server, the recovered set of client-encrypted decryption keys to the set of client-encrypted/client-derived decryption keys; and creating, based on the comparing, an indication of matching client-encrypted decryption keys that are included in both of the recovered set of client-encrypted decryption keys to the set of client-encrypted/client-derived decryption keys, wherein: filtering the set of client-encrypted queries includes removing, from the client-encrypted queries, queries having bucket identifiers for database entries corresponding to the recovered set of client-encrypted decryption keys that are not matched by any of the client-encrypted/client-derived decryption keys.

Methods can include shuffling, by the server, the set of sever-client-encrypted identifiers resulting in a set of shuffled server-client-encrypted identifiers that has a different ordering than the set of server-client-encrypted identifiers, wherein: transmitting the set of server-client-encrypted identifiers to the client device includes transmitting the shuffled server-client-encrypted identifiers to the client device; and receiving a set of client-encrypted queries that were encrypted by the client device includes receiving a set of shuffled client-encrypted queries that were generated using the set of shuffled server-client-encrypted identifiers.

Methods can further include receiving a set of client-encrypted/client-derived decryption keys by receiving a shuffled set of client-encrypted/client-derived decryption keys that (i) were derived by the client device using the shuffled server-client-encrypted identifiers, and (ii) are encrypted by the client device.

Particular embodiments of the subject matter described in this specification can be implemented so as to realize one or more of the following advantages. The techniques discussed herein enable a client to retrieve information from a server without revealing contents of a query to the server, and without requiring the client to download an entire encrypted database of a content provider, whereas in previous systems, an entire encrypted database may be required to be downloaded to prevent the server from obtaining specific information contained in the query. As such, the techniques discussed herein protect user privacy, while also limiting the amount of data that must be exchanged over a network, and stored by a client device.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification relates to data processing and information retrieval. More specifically, this specification describes techniques for retrieving data from databases while preserving both client and server privacy. For example, if the client queries a server database, the client does not reveal any details to the server about the data that is being queried (also referred to as client query privacy). Simultaneously, the server does not reveal, to the client, any details regarding contents of the database that are not queried by the client (also referred to as server database privacy). These techniques can be used in batch processing of queries to provide for a more efficient information retrieval system that also protects client privacy. For example, if a client is retrieving data for one or more users, the user privacy is protected by ensuring that a server being queried cannot learn information about the users that a client is querying the server about, and also prevents the client from learning any information about other users that may be stored by the server.

Figure 1A:
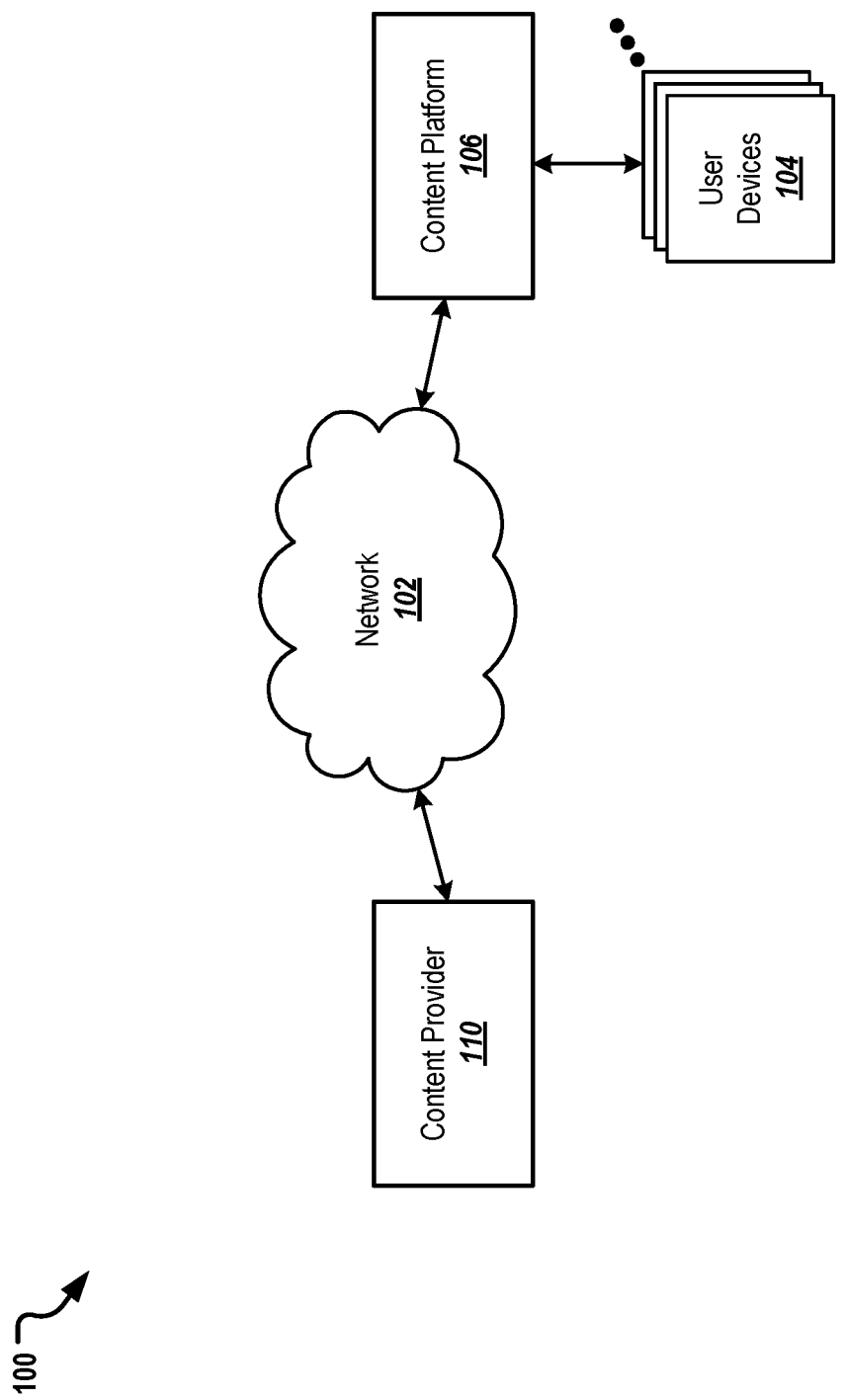
FIG. 1A is a block diagram of an example environment in which content is distributed and presented to a user device.

FIG. 1A is a block diagram of an example environment 100 in which content is distributed and presented to a user device. The example environment 100 includes a network 102, such as a local area network (LAN), a wide area network (WAN), the Internet, or a combination thereof. The network 102 connects content platforms 106, and content providers 110. The example environment 100 may include many different content providers 110, content platforms 106, and user devices 104.

A user device 104 is an electronic device that is capable of requesting and receiving content over the network 102. Example user devices 104 include personal computers, mobile communication devices, digital assistant devices, and other devices that can send and receive data over the network 102. A user device 104 typically includes an operating system that is primarily responsible for managing the device hardware and software resources such as applications. The user device 104 also includes a device storage to store data temporarily or permanently based on the particular implementation, application, and use case. A user device 104 typically includes user applications such as a web browser or an email client, to facilitate the sending and receiving of data over the network 102, but native applications executed by the user device 104 can also facilitate the sending and receiving of content over the network 102. Examples of content presented at a user device 104 include webpages, word processing documents, portable document format (PDF) documents, images, videos, and search results pages and digital ads.

A content platform 106 is a computing platform that enables distribution of content. Example content platforms 106 include search engines, social media platforms, news platforms, data aggregator platforms, or other content sharing platforms. Each content platform 106 may be operated by a content platform service provider. The content platform 106 may present content provided by one or more content providers 110. In the above example, the news platform may present content created by different authors and provided by one or more content providers 110. As another example, the content platform 106 may be a data aggregator platform that does not publish any of its own content, but aggregates and presents news articles provided by different news websites (e.g., content providers 110).

In some implementations, the content platform 106 can distribute digital content to one or more entities. Examples of entities can include users that are connected to the internet via user devices 104. For example, the content platform 106 can let one or more users subscribe to and/or register with the content platform 106. In response, the content platform 106 can retrieve digital content from the content providers 110 and provide the retrieved content to the user devices 104 of users. The content provider 110 includes a data storage device (also referred to as a database) that stores digital content in the form of key-value pairs. For example, the database of the content provider 110 can include multiple keys and for each key, a corresponding value that is retrieved by the content platform 106.

In some implementations, the content platform 106 can assign an entity identifier to each of the one or more entities. In this example, the content platform 106 can assign an entity identifier to each of the one or more users so that the content platform can distinguish between the users. In some implementations, the content platform 106 can use information provided by the one or more users and/or the user devices as the unique entity identifier. For example, the content platform 106 can use, as the unique entity identifier, an electronic mail identifier (email id) provided by a user, a cell phone number provided by a user, or a media access control (MAC) address of the user device 104 of the user. In some implementations, the content platform 106 can assign an entity identifier to a group of two or more users based on the characteristics of the users in the group of users. For example, the content platform 106 can assign to a group of users a common entity identifier based on similar interests in the context of digital content accessed by the users. In another example, users can be assigned to a group and can be assigned a common entity identifier based on the subscriptions with the digital content. In some implementations, the content platform 106 can assign multiple entity identifiers to a single user. For example, the content platform 106 can assign both email id and a cell phone number as an entity identifier for a user.

To retrieve digital content from the content providers 110, the content platform 106 and the content provider 110 implements an information retrieval technique that ensures data privacy in a way that the content platform 106 does not reveal any details to the content providers 110 about what information is being queried. The retrieval technique further ensures that the content providers 110 does not reveal any details to the content platforms 106 about other information that is stored on the computing systems of the content providers 110. While this specification refers to content providers 110 and content platforms 106, the information retrieval techniques discussed herein can be used by any two systems that want to exchange information in a privacy preserving manner. For purposes of example, the two systems that exchange information in a privacy preserving manner are referred to as a client and a server where a client uses the information retrieval protocol to retrieve information from the server. Of course, other systems can carry out the operations discussed herein. A high-level overview of the information retrieval technique is explained with reference to FIG. 1B.

Figure 1B:
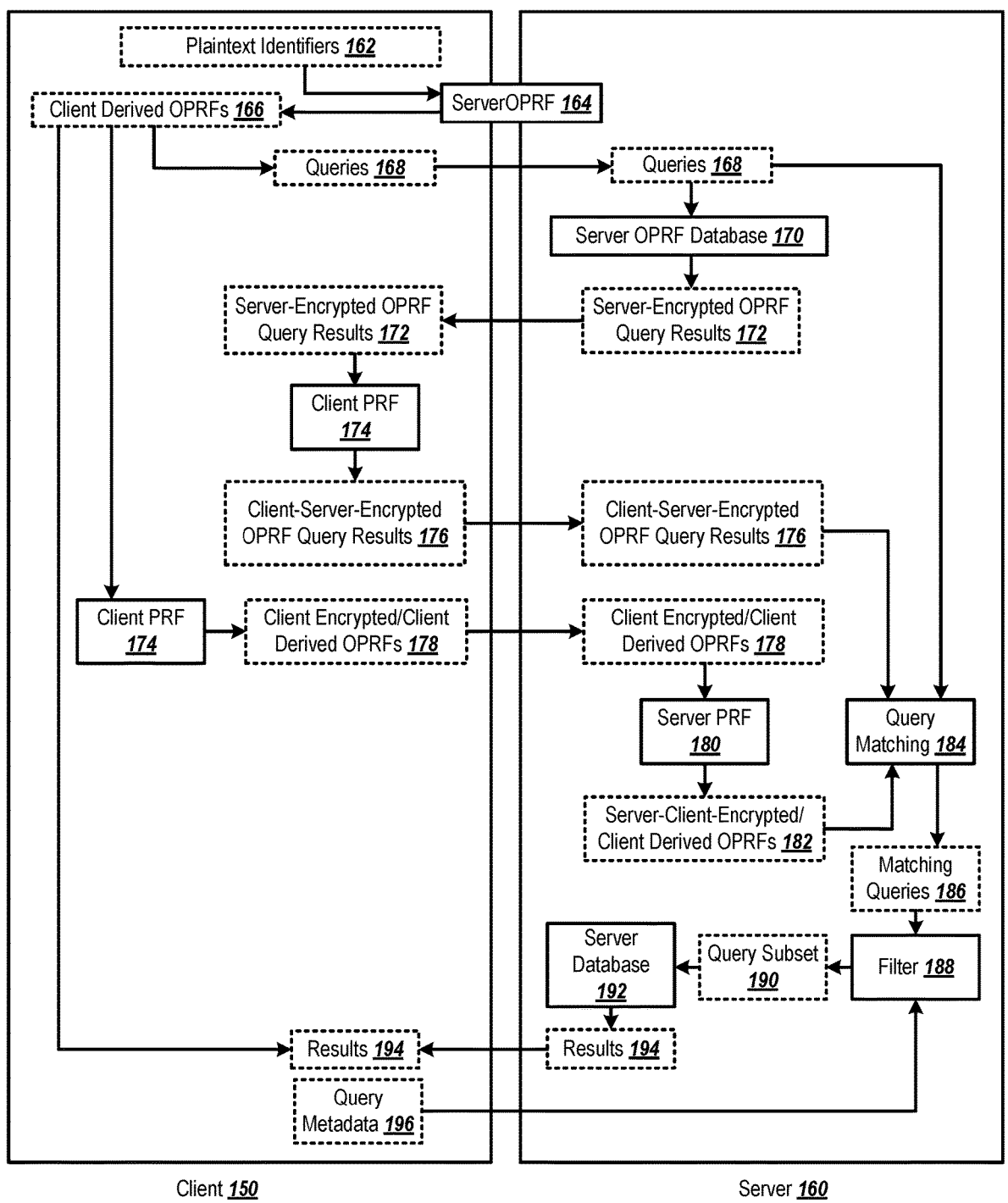
FIG. 1B is a block diagram of an example information retrieval protocol.

FIG. 1B is a block diagram of an example information retrieval protocol used by a client 150 to retrieve information from a server. In some implementations, the client 150 and the server 160 each possess a distinct pseudorandom function. These are referred to as clientPRF and serverPRF, respectively. A PRF is a function $f_k(x)$ of some value x for some key k where the outputs of the function are indistinguishable for a randomly chosen key k. In other words, if k is not known, it should be computationally infeasible to determine if a value was produced by some $f_k(x)$ or was picked at random from the possible outputs of $f_k$. Furthermore, there should be sufficiently many possible outputs to $f_k$ so that the odds of two different inputs having the same output are minuscule. For example, $f_k$ might have $2^{64}$ possible distinct output values.

The server 160 can also possess an oblivious pseudorandom function (OPRF) referred to as a serverOPRF 164 which is a two-party protocol between the server 160 and the client 150 where there is some pseudorandom function $f_k$ known only to the server. The serverOPRF 164 causes the client 150 to learn $f_k(x)$ for some value x that is known by the client 150 without leaking any information to the server 160. In other words, a serverOPRF 164 is a protocol between a server 160 holding a key to a PRF and a client 150 holding an input. At the end of the server-client interaction, the client 150 can learn the output of the serverOPRF 164 on its input provided by the client 150 without learning anything else, if desired. The server 160 learns nothing about the client's 150 input or the OPRF output.

In some implementations, serverOPRF 164, serverPRF 180, and clientPRF 174 can be implemented using deterministic, commutative encryption. In some implementations, the Pohlig-Hellman cipher on elliptic curves can be used to provide deterministic and commutative encryption.

The client 150 can assign multiple entity identifiers to each of the one or more entities. For example, assume that the client 150 has M users and to each of the M users, the client 150 assigns N entity identifiers. To retrieve content, the client 150 can generate N queries for each of the M entities where each query corresponds to one of the N entity identifiers assigned to the entities. In another implementation, the client 150 can generate a query group for each of the M entities such that each query group can include N queries that each correspond to the N identifiers assigned to each of the entities. For purposes of example, the techniques and methods will be explained with reference to an implementation where the client 150 generates M query groups and the N corresponding queries for each of M query groups.

The server 160 implements a server database 192 that stores digital content in the form of a mapping between key and value (referred to as a key-value pair). A key can be an entity identifier and/or a pointer for a value that is the digital content that is being queried by the client. A server database 192 can include multiple keys and for each key a respective value corresponding to the key. For example, the server can include, in the database 192, multiple keys where each key can uniquely identify one or more entities of the clients for which the client is retrieving content from the server. In another example, the server can include, in the database, keys that do not necessarily identify entities. In such implementations, the value of the corresponding key is data that the server allows clients to query based on other factors such as client permissions or entity permissions granted to the client or the entities respectively.

In some implementations, the key of the key-value pair of the server database 182 is associated with one or more entity identifiers that were assigned to the entities by the clients. While querying the server 160, the client 150 provides the server 160 with queries that includes entity identifiers in a way that the details of the entity identifiers are not disclosed to the server. As explained later, the server can select content (e.g., data of any kind) from the server database based on the entity identifier even though the entity identifiers are masked from the server.

In some implementations, the server 160 generates mappings (e.g., a dictionary, a table, a database etc.) using the entries of the server database that is referred to as a server OPRF database 170. The server OPRF database 170 is a mapping of each key in the server database to the serverPRF of its serverOPRF. This can be represented using the following $$k \rightarrow \text{serverPRF}(\text{serverOPRF}(k))$$

where K is a set of all keys in the server database and k is in K.

In some implementations, the server 160 encrypts the server database 192 to generate a server encrypted database such that each database entry of the server encrypted database is server-encrypted and is capable of being decrypted by a corresponding client derived OPRF value. The server 160 generates the server encrypted database using a deterministic homomorphic encryption technique such as an Advanced Encryption Standard (AES). The AES key can be derived from the serverOPRF value using HMAC-based Extract-and-Expand Key Derivation Function (HKDF). The server encryption can be represented as follows $$\text{AES}(\text{HKDF}(\text{serverOPRF}(k)), \text{value})$$

where the server 160 encrypts each key k is in K where K is a set of all keys in the server database and HKDF (serverOPRF(k)) is the key used for the AES encryption. In such implementations, the serverPRF of its serverOPRF is the decryption key for entries of the server database that were server-encrypted while generating the server encrypted database.

To further explain the information retrieval protocol, let's assume that the client 150 and the server 160 are two communicating parties and the information retrieval protocol ensures that while retrieving information from the server 160, the client 150 should not be able to infer anything beyond what it can infer based on the queries and the server 160 should not be able to determine if any key is included in any of the client queries.

The information retrieval protocol can begin with the client 150 obtaining the entity identifiers 162 in plaintext of entity for which the client 150 wishes to retrieve information. After retrieving the entity identifiers 162, the client 150 can use the serverOPRF 164 to obtain OPRF values corresponding to each of the entity identifiers 162. For example, the client 150 can provide the M*N entity identifiers 162 as input to the serverOPRF that generates a corresponding OPRF value. Since the client 150 picked the inputs to serverOPRF (and by the oblivious property of OPRFs), the server 160 does not learn the resulting values we call these client derived OPRF values 166. For example, the set of M*N OPRF values are referred to as a set of client derived OPRF values 166.

In some implementations, the client 150 after generating the set of client derived OPRF values 166, encrypts each of the client derived OPRF values in the set 166 using the clientPRF 174 and generates a corresponding client-encrypted/client-derived OPRF value. Together the client-encrypted/client-derived OPRF values are referred to as a set of client-encrypted/client-derived OPRF values 178 that is transmitted to the server 160.

In some implementations, the client 150 generates queries 168 corresponding to each client derived OPRF value in the set 166. In some implementations, the client 150 generates a query group for each of the M entities where each query group includes N queries such that each of those N queries in a query group correspond to an entity identifier that was assigned to a particular entity. The M query groups 168 are then transmitted to the server 160.

In some implementations, after receiving the query groups 168, the server 160 executes the queries of each of the query group in the set of query groups 168 on the server OPRF database 170 to generate a respective server encrypted OPRF query result. The set of all server encrypted OPRF query results 172 is then transmitted to the client 150. For example, the server 160 executes the N queries for each of the M query groups on the server OPRF database 162 to generate a set of server encrypted OPRF query result 172.

In some implementations, the client 150 after receiving the set of server encrypted OPRF query result 172, encrypts (for e.g., using the clientPRF 174) each server encrypted OPRF query result in the set 172 to add a layer of client encryption to generate a set of client-server-encrypted OPRF query result 176 that is transmitted back to the server 160. Note that the client 150 uses the same clientPRF 174 to generate the set of client-encrypted/client-derived OPRF query values 178 and the set of client-server-encrypted OPRF query result 176.

Note that at this stage of the information retrieval protocol, the server 160 has the set of client-encrypted/client-derived OPRF query values 178 and the set of client-server-encrypted OPRF query result 176.

In some implementations, the server 160 encrypts each of the client-encrypted/client-derived OPRF query values in the set 178 using the serverPRF 180 to add a layer of server encryption to generate a set of server-client-encrypted/client-derived OPRF values 182. The set of server-client-encrypted/client derived OPRF query values 182 includes the server-client-encrypted/client-derived OPRF values corresponding to the M*N queries of the M query groups.

In some implementations, the client 150 can compare the set of server-client-encrypted/client-derived OPRF query values 182 and the set of client-server-encrypted OPRF query results 176 to select all OPRF values that are encrypted by both the client 150 and the server 160 and that are present in both the sets 176 and 182. After selecting all OPRF values present in both the sets 176 and 182, the server 160 can generate a set of matching queries 186 that include queries from among the M*N queries that correspond to the filtered out OPRF values indicating that the queries in the set of matching queries 186 were successfully executed by the server 160 on the serverOPRF database 170.

In some implementations, the server 160 can implement a filter 188 to select a subset of queries 190 from the set of matching queries 186 so as to retrieve values from the server database that are the best match for each of the M users. For example, the filtering of the subset of queries 190 can be tuned to select values from the server database 192 based on the ordering of the N identifiers assigned to the users. For this, the client 150 could arrange each query group in order of descending identifier quality, and the server 160 can then pick the single best quality identifier for which the server 160 has data.

In some implementations, queries can be filtered based on arbitrarily sophisticated logic, taking into account whether the client 150 would be able to derive any value from a query and also taking into account any additional data (for e.g., query metadata 196) the client 150 wishes to provide to the server 160 for this purpose. For example, filtering can be performed by evaluating one or more Boolean expressions where a literal for each query indicates whether or not the client 150 would be able derive value from the query.

After selecting the subset of queries 190, the server 160 can execute the queries on the server database 192 to retrieve query results 194 that are further transmitted to the client 150. In some implementations, the queries are encrypted using homomorphic encryption, and thus the results are also encrypted with homomorphic encryption. In such implementations, after executing the subset of queries 192, the server 160 retrieves server encrypted query results 194 that is further transmitted to the client 150. In such implementations, the client 150 after receiving the server encrypted query results 194, decrypts (or removes) the server encryption using the corresponding client-derived OPRF values 166 to generate the plaintext values of the server encrypted retrieved query results 194.

In some implementations, the client 150 can generate queries using either homomorphic encryption such as ring learning with errors (RWLE) or by using garbled circuits. In some implementations, the query results are encrypted with AES encryption with an AES key derived from the serverOPRF of the result's corresponding database key.

In some implementations, the queries can be partially or fully executed by a cloud provider, cleanroom environment, or a third party computing system.

The information retrieval techniques are further explained with reference to FIG. 2, and entities that are requesting information from a database are referred to as clients and the entities that maintain the database of information, and return information stored in the database are referred to as servers.

Figure 2:
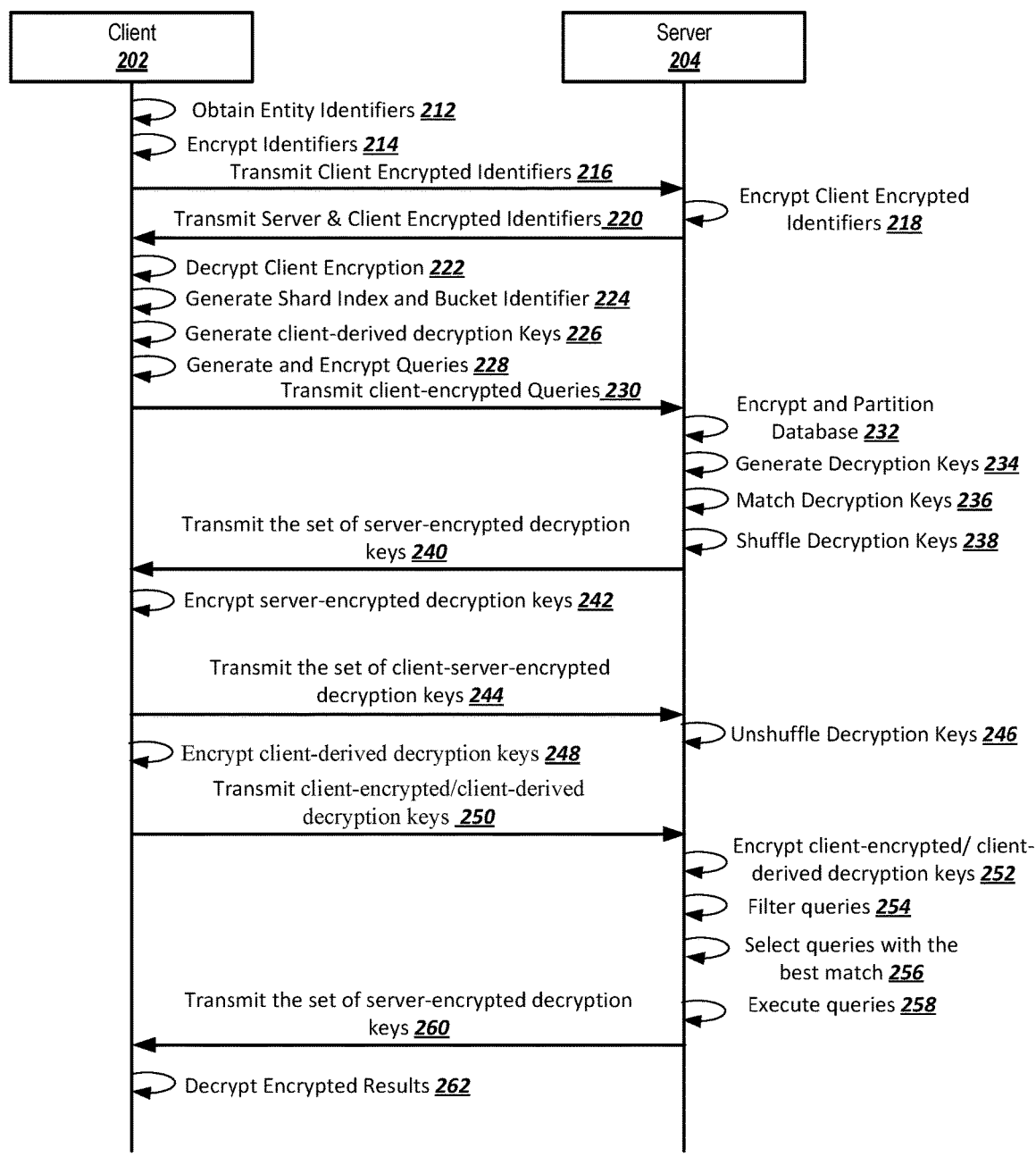
FIG. 2 is a swim lane diagram of an example process of retrieving content by a client from a server.

FIG. 2 is a swim lane diagram of an example process 200 of retrieving content by a client from a server. Operations of the process 200 can be implemented, for example, by a client 202 and a server 204. Operations of the process 200 can also be implemented as instructions stored on one or more computer readable media, which may be non-transitory, and execution of the instructions by one or more data processing apparatus can cause the one or more data processing apparatus to perform the operations of the process 200.

The example described with reference to FIG. 2 is an example implementation where the server 204 encrypts the server database and generates encrypted results that are later decrypted by the client 202 using decryption keys that are a specific implementation of the client derived OPRF values.

In some implementations, the server 204 after receiving the multiple queries selects data based on the query that is the best match in the server database. For example, assume that N entity identifiers have been assigned to a particular user. There can be situations when the server can include contents corresponding to each of the N entity identifiers. In such a situation, the server can select content corresponding to an entity identifier that has been assigned the highest priority. In another example, the server and client can mutually agree to order the N entity identifiers such that the server will select and transmit content based on the order of the N entity identifiers. In another situation, the server might not have content corresponding to some of the entity identifiers from among the N entity identifiers. For example, if the server does not contain content for a specific entity identifier, the server can select content based on the other entity identifiers in the order. For brevity, the process 200 assumes that the N entity identifiers are in an order and that the server will select content based on the first entity identifier from among the N entity identifiers. If the server database does not have data corresponding to the first entity identifier, the server will select content based on the second entity identifier and so on.

The client 202 obtains unique entity identifiers (212). To uniquely identify the one or more entities, the client 202 can assign one or more entity identifiers to each of the one or more entities. In some implementations, the client 202 can use information provided by entities such as users and/or the user devices 104 as the entity identifiers. For example, the client 202 can use, as a unique entity identifier, an electronic mail identifier (email-id or email address), cell phone number, or media access control (MAC) address of the user devices 104. The client can be any computing system that requests information from another system (e.g., a server system) that stores information or maintains a database. The client 202 can maintain the entity identifiers as a matrix (referred to as a matrix P) of dimension M*N where M is the number of entities and N is the number of entity identifiers assigned to each entity (e.g., user).

The client 202 device encrypts the entity identifiers to create client-encrypted identifiers (214). To prevent the server 204 from accessing the entity identifiers in plaintext, the client 202 encrypts the entity identifiers of the matrix P using a deterministic and commutative encryption technique to generate an encrypted form of the entity identifiers (referred to as "client-encrypted identifiers"). As used throughout this specification, the phrase "client-encrypted identifiers" refers to identifiers that have been encrypted by the client, but not the server. In general, a commutative encryption is a kind of an encryption that enables a plaintext to be encrypted more than once using different entity's public keys. In this system, decryption is not required before the encryption/re-encryption processes. Moreover, the resulting ciphertext (also referred to as encrypted text) can be decrypted by the designated decryption techniques without considering the order of public keys used in the encryption/re-encryption processes. In other words, the order of keys used in encryption and in decryption do not affect the computational result, and allow one encrypting party (e.g., a client 202) to remove their encryption even after another party (e.g., a server) has applied further encryption to data that was encrypted by the first encrypting party.

The client 202 transmits the client-encrypted identifiers to the server 204 (216). For example, after encrypting the entity identifiers of the matrix P, the client 202 transmits the client-encrypted identifiers to the server 204 over the network 102. More specifically, the client 202 encrypts each of the M*N entity identifiers in the matrix P to generate a set of M*N client-encrypted identifiers, that is further transmitted to the server 204.

The server 204 encrypts the client encrypted identifiers to create server-client-encrypted identifiers (218). In some implementations, after receiving the set of M*N client-encrypted identifiers from the client 202, the server 204 re-encrypts (e.g., further encrypts) the client-encrypted identifiers using a commutative and deterministic encryption technique to generate a server encrypted form of the client encrypted identifiers (referred to as "server-client-encrypted identifiers"). In other words, the server 204 adds another layer of encryption on each of the M*N client encrypted identifiers. Note that the server 204 does not have access to the identifiers in plaintext because the identifiers were already encrypted by the client 202, and the server 204 does not have the decryption key. As used throughout this specification the phrase "server-client-encrypted identifier refers to an identifier that has been encrypted by both of the client and the server.

The server 204 transmits the server-client-encrypted identifiers back to the client 202 (220). For example, after generating the set of M*N server-client-encrypted identifiers, the server 204 transmits the server-client-encrypted identifiers to the client 202 over the network 102.

The client 202 removes the prior client encryption from the server-client-encrypted identifiers to obtain server-encrypted identifiers (222). In some implementations, after receiving the set of M*N server-client-encrypted identifiers, the client 202 uses techniques to decrypt (or remove) the encryption that was performed by the client 202 in step 214 to generate "server-encrypted identifiers" for each of the M*N server-client-encrypted identifiers. Note that the client 202 is able to remove client encryption since the encryption techniques are commutative in nature. The server-encrypted identifiers that are generated after removing the client encryption are identifiers encrypted by the server using the commutative and deterministic encryption technique. In other words, after the client 202 removes the original encryption that was applied to the identifiers, the identifiers remain encrypted by the server, and are then server encrypted versions of the client identifiers, which are used by the client 202 to generate queries that will be submitted to the server 204 to request information corresponding to the identifiers. As used throughout this specification, the phrase "server-encrypted identifiers" refers to identifiers that are encrypted by the server, but not encrypted by the client.

In some implementations, steps 218-222 of the process 200 can be implemented using the serverOPRF. As mentioned before, an Oblivious PRF is a protocol between a server holding a key to a pseudo random function (PRF) and a client holding an input. At the end of the server-client interaction, the client learns the output of the OPRF on its input provided by the client and nothing else. The server learns nothing about the client's input or the OPRF output.

To facilitate creation of queries, the client 202 generates a shard index and a bucket identifier for each server encrypted identifier (224). In some implementations, the client 202 implements a hashing technique to generate a query that can include a shard index and a bucket identifier (also referred to as a bucket-id). An example hashing technique of generating the query is further explained with reference to FIG. 3. The client 202 uses the process 300 to generate a query for each of the M*N server-encrypted identifiers. Each query that is generated for each identifier will include the shard index and the bucket id created using the server-encrypted identifier, as discussed below.

The client 202 generates client-derived decryption keys using each server encrypted identifier (226). The client-derived decryption keys will be used by the client to decrypt query results provided by the server 204 in response to the queries submitted by the client 202. In some implementations, the client 202 can generate a client derived decryption key for each of the server-encrypted identifiers generated in 222. For example, the client 202 can implement a HKDF which is a hash-based message authentication code (HMAC) cryptographic key derivation function for expanding a key into one or more cryptographically strong secret keys. Together the decryption keys for the M*N server-encrypted identifiers is referred to as a set of client-derived decryption keys.

The client 202 generates and encrypts queries (228). In some implementations, the client 202 uses the bucket-id computed using the process 300 to generate an indicator vector of length n/P where the element with index equal to the bucket-id is 1 and the other elements are 0 (recalling that P is the number of shards and n/P is the number of distinct bucket-ids). In some implementations, the indicator vector can be compressed using known compression techniques. The client 202 generates an indicator vector for each of the M*N server-encrypted identifiers.

In some implementations, the client 202 can encrypt each of the M*N indicator vectors to generate a corresponding FHE encrypted bucket vector. In general, homomorphic encryption is a form of encryption that permits users to perform computations on its encrypted data without first decrypting it. These resulting computations are left in an encrypted form which, when decrypted, result in an identical output to that produced had the operations been performed on the unencrypted data. Properties of FHE can include addition, multiplication and absorption. To illustrate, if $\{x\}$ denotes a FHE of x, then the addition $\{x\}+\{y\}$ can yield $\{x+y\}$ without revealing x, y or x+y. Similarly, the multiplication $\{x\}*\{y\}$ can yield $\{xy\}$ without revealing x, y or xy and the absorption $\{x\}*y$ can yield $\{xy\}$ without revealing x. In some implementations, the properties of FHE can include the ability to convert an encrypted vector into a specified number of separate encrypted values (one for each item in the vector) without revealing any details about the items in the vector.

After encrypting each of the indicator vectors, the client 202 can generate a corresponding query (referred to as a client-encrypted query) that includes a corresponding shard index and a corresponding FHE encrypted bucket vector. Each query can be denoted as FHE QUERY (database, query) where the database represents a data storage that stores a mapping of key and value i.e., the database stores multiple keys and for each key a corresponding value. In such implementations, the client generates a total of M*N queries where each query corresponds to a server-encrypted identifier.

In general, the number of unique entity identifiers for which the client 202 is retrieving data from the server database is less than the number of unique entity identifiers (key of the key-value pair) in the server database. In some implementations, in order to mask the true queries and their distribution to the shards generated in step 224 of the process 200, the client 202 can generate padding queries that can be transmitted to the server 204. The client 202 can determine the number of padding queries required, for example, based on information provided by the server 204. For example, the server 204 can specify that a certain number of padding queries (e.g., 99 padding queries or another appropriate number of padding queries) is required to be generated and submitted by the client 202 for each real query being submitted by the client 202.

The client 202 transmits the query to the server 204 (230). For example, after generating the client-encrypted queries for each of the M*N server encrypted identifiers and the padding queries, the client 202 transmits the full set of queries to the server 204 over the network 102. In some implementations, multiple queries are sent to the server in a batch, such that the server can process the queries at the same time (e.g., in a batch process).

The server 204 encrypts and partitions the database (232). By encrypting the database, the server is encrypting a set of data stored in the database, such that each database entry is server-encrypted and capable of being decrypted by a corresponding decryption key. The server 204 can also encrypt the server database prior to receipt of one or more queries constructed by the client 202 after the client 202 receives the server-client-encrypted identifiers. For example, as the server 204 is building the server database, or adding information to the database, the server can encrypt the data being stored in the server database before homomorphic encryption is applied to the data. In some implementations, the server 204 encrypts the server database using an encryption technique such as an Advanced Encryption Standard (AES). For example, the server 204 encrypts the value of each key-value pair of the server database using the AES encryption technique based on an AES-key generated using the HMAC-based Extract-and-Expand Key Derivation Function (HKDF) and the corresponding key of the key-value pair. Each key of the key-value pair of the server database is further replaced by an integer (referred to as a record key) that is generated using a hash function (e.g., SHA256) that maps the key to an integer within the range [0, n) where n is a tunable parameter known to both the server 204 and the client 202. This results in a record key-AES encrypted value pair in place of each of the key-value pair in the server database. The hash function can further utilize cryptographic salt added to each key of the key-value pair before hashing. In some implementations, the cryptographic salt is also known to the client 202 that can be used by the client 202 while encrypting the queries.

In some implementations, the server 204 partitions the server database into shards. For example, by deriving shard indexes from record keys using the same technique used by the client to derive shard indexes. Each shard may include multiple record key-AES encrypted value pairs. In some implementations, the server 204 partitions each shard into even smaller partitions called buckets by deriving a bucket-id for each record key in a shard using the same technique that the client used. For example, shard index and the bucket-id can be computed as the remainder and the integer quotient respectively when the converted number is divided by P. Observe that this yields at most n/P buckets per shard.

After partitioning each shard into multiple buckets, the AES encrypted values of the record key-AES encrypted value pairs are stored inside each bucket such that the record key of the record key-AES encrypted value pairs indexes both the shard and the bucket inside the shard. It should be noted that the server 204 uses the same methodology as the client 202 to derive a shard number and bucket-id from each key of the key-value pair in the server database.

In some implementations, the server 204 concatenates the AES encrypted values of each bucket into a bytestring. For example, if a particular bucket includes 3 AES encrypted values, the 3 AES encrypted values are concatenated one after the other to generate a bytestring. The server 204 identifies the offset values (index location of the bytestring) of the AES encrypted values and encrypts the offset values using an encryption technique such as AES based on the corresponding record keys. For example, if the bytestring includes 3 AES encrypted values of uniform length, the server encrypts the offset values of each of the 3 AES encrypted values in the bytestring using AES based on the respective record key of the record key-AES encrypted value pair. After generating the encrypted offset values, the server 203 prepends the encrypted offset values to the bytestring. The server 204 further prepends the number of AES encrypted values to the bytestring. In this example, the server 204 prepends the value 3 to the bytestring. The server 204 further splits the bytestring into chunks of c bytes each where c is an integer known in advance to both the client and the server. The c-byte chunks can be further indexed based on their relative position in the bytestring. For example, if c=1, a bucket B can be represented as B=["p","q","r","s"] where "pqrs" can be the bytestring that is split into c-byte chunks "p", "q", "r" and "s" having indices 1-4 in the bucket respectively. In another example, if c=2, a bucket B can be represented as B=["pq","rs","tu","v"] where "pqrstuv" can be the bytestring that is split into c-byte chunks "pq", "rs", "tu" and "v" having indices 1-4 in the bucket respectively.

The server 204 generates server OPRF database (234). In some implementations, the server 202 can generate decryption keys for each of value of the key-value pairs in the server database that was encrypted using an encryption technique such as an AES as explained with reference to step 230. For example, the server 204 can first encrypt the keys of the key-value pairs of the server database using a deterministic commutative encryption and then generate a corresponding decryption key using HKDF based on the server-encrypted keys. In some implementations, the decryption keys that are generated by the server 204 are further encrypted using a deterministic commutative encryption to generate server-encrypted decryption keys. As used throughout this specification, the phrase "server-encrypted decryption keys" refers to decryption keys that are encrypted by the server, but not encrypted by the client.

In some implementations, the server 204 can maintain the server-encrypted decryption keys by creating a database (referred to as a server OPRF database) that stores the server-encrypted decryption keys. In such implementations, the server encrypted database stores the server-encrypted keys and for each server-encrypted key, a corresponding server-encrypted decryption key. In other words, each entry in the server encrypted database is a pair of server-encrypted key and the server-encrypted decryption key.

In some implementations, the server 204 partitions the server encrypted database into shards (similar to the server database). To partition the server encrypted database, each server-encrypted key of a pair in the server encrypted database is further replaced by an unsigned integer (that is identical to the record key that was generated in step 230) that is generated using a hash function (e.g., SHA256) that maps the key to an integer within the range [0, n) where n is a tunable parameter known to both the server 204 and the client 202. The server 204 partitions the server encrypted database by deriving shard indexes from unsigned integers by using the same technique used by the client to derive shard indexes.

Each shard may include multiple pairs of a server-encrypted key and a server-encrypted decryption key. In some implementations, the server 204 partitions each shard into even smaller partitions called buckets by deriving a bucket-id for each unsigned integer in a shard using the same technique that the client used. For example, shard index and the bucket-id can be computed as the remainder and the integer quotient respectively when the converted number is divided by P.

After partitioning each shard into multiple buckets, the server-encrypted decryption keys of the pairs in the server encrypted database are stored inside each bucket such that the unsigned integer indexes both the shard and the bucket inside the shard. It should be noted that the server 204 uses the same methodology as the client 202 to derive a shard number and bucket-id.

Similar to the server database, the server 204 concatenates the server-encrypted decryption key of each bucket into a bytestring. For example, if a particular bucket includes 3 server-encrypted decryption key, the 3 server-encrypted decryption key are concatenated one after the other to generate a bytestring. The server 204 identifies the offset values (index location of the bytestring) of the server-encrypted decryption key and encrypts the offset values using an encryption technique such as AES based on the corresponding unsigned integer. For example, if the bytestring includes 3 server-encrypted decryption key of uniform length, the server encrypts the offset values of each of the 3 server-encrypted decryption key in the bytestring using AES based on the respective unsigned integer of the server encrypted database pair. After generating the encrypted offset values, the server 203 prepends the encrypted offset values to the bytestring. The server 204 further prepends the number of server-encrypted decryption key to the bytestring. In this example, the server 204 prepends the value 3 to the bytestring. The server 204 further splits the bytestring into chunks of c bytes each where c is an integer known in advance to both the client and the server. The c-byte chunks can be further indexed based on their relative position in the bytestring.

The server 204 identifies a set of server-encrypted decryption keys by executing queries and matching decryption keys (236). In some implementations, the server 204 executes each of the M*N client-encrypted queries to identify a set of server-encrypted decryption keys corresponding to the client-encrypted queries from among the multiple server-encrypted decryption keys in the server OPRF database.

The server 204 can process the client-encrypted queries using an optimized batch process that reduces the resource consumption required to retrieve content from the server OPRF database. The optimized process can be implemented in a manner that facilitates concurrent processing by splitting the server encrypted database into smaller chunks (referred to as shards and identified using shard index), and processing them in parallel on multiple computing systems thereby reducing the computational resources required to retrieve the set of server-encrypted decryption keys from the server OPRF database. This is further explained with reference to FIG. 4.

In some implementations, the server 204 optionally shuffles the server-encrypted decryption keys (238). The server 204 shuffles the M*N server-encrypted decryption keys in the set of server-encrypted decryption keys prior to transmitting the set to the client 102. This involves randomly changing the order of the server-encrypted decryption keys when compared to the order in which the client-encrypted queries were received from the client 202.

The server 204 keeps track of the shuffling process by storing, for example, a mapping that maps the order of the server-encrypted decryption keys to the order of the client-encrypted queries. In some situations, the server 204 can implement a shuffling algorithm with a fixed set of parameters for e.g., a seed value that can be used to shuffle the server-client-encrypted identifiers and generate the ordering sequence at a later point of time. The server 204 keeps the order of the shuffled sequence private and does not share it with the client 202. For example, the mapping or the seed value is stored at the server 204 and is not shared with the client 202.

For a better understanding of the forthcoming techniques, let us first analyze the set of server-encrypted decryption keys generated by the server 204 in step 238 of the process

200. As explained previously in this document, the client 202 submits queries to retrieve content from the server database for a specified number of entities where each entity is assigned multiple entity identifiers. For example, the client 202 has M entities and each of the M entities have been assigned N entity identifiers. Note that the server database includes contents for more than M entities and for each entity in the server database, the server can include multiple identifiers (that is referred to as the key of the server database). It should also be noted that the number of multiple identifiers can be correlated to the N entity identifiers assigned to the entities by the client 202. After executing the queries on the server OPRF database, the server 204 identifies the set of server-encrypted decryption keys, which are the decryption keys corresponding to the M*N entity identifiers. However, for each of the M entities, the server 204 will select content based on one particular entity identifier that is the best match among all the identifiers assigned to the respective entity. In some implementations, the best matching identifier is the most well-defined identifier for which a match is detected. For example, assume that one matching identifier is an e-mail address, and a second matching identifier is an email address and a zip code. In this example, the second matching identifier is more well-defined because it provides more information than the email address alone, such that the content stored in association with the second identifier will be provided in response to the query. The forthcoming techniques of the process 200 selects content based on one particular entity identifier without the client 202 having any knowledge of which entity identifier was used by the server 204 to select content.

The server 204 transmits the set of server-encrypted decryption keys to the client 202 (240). For example, after identifying the set of server-encrypted decryption keys by executing the client-encrypted queries on the server encrypted database and shuffling the server-encrypted decryption keys of the set, the server 204 transmits the set of shuffled server-encrypted decryption keys of the one or more users to the client 202 over the network 102.

The client 202 device encrypts the server-encrypted decryption keys to obtain client-server-encrypted decryption keys (242). After receiving the set of server-encrypted decryption keys from the server 204, the client 202 re-encrypts (e.g., further encrypts) the M*N server-encrypted decryption keys in the set of server-encrypted decryption keys to generate a set of client-server-encrypted decryption keys. In other words, the client 202 adds another layer of encryption on each of the server-encrypted decryption keys. Note that the client 202 does not have access to the server-encrypted decryption keys in plaintext because the decryption keys were already encrypted by the server 204. As used throughout this specification, the phrase "client-server-encrypted decryption keys" refers to decryption keys that are encrypted by the server and the client.

The client 202 transmits the set of client-server-encrypted decryption keys to the server 204 (244). For example, after encrypting the server-encrypted decryption keys in the set of server-encrypted decryption keys, the client 202 transmits the set of client-server-encrypted decryption keys to the server 204 over the network 102. In turn, the server receives, from the client device, the set of client-server-encrypted decryption keys that includes the set of server-encrypted decryption keys that have been further encrypted by the client device.

If the server shuffled the decryption keys at step 238, the server 204 unshuffles the client-server-encrypted decryption keys (246). In some implementations, the server 204 after receiving the M*N client-server-encrypted decryption keys unshuffles the client-server-encrypted decryption keys to nullify the shuffling performed by the server in step 238 of the process 200. Note that by shuffling and unshuffling the decryption keys, the server 204 can obtain the set of client-server-encrypted decryption keys from the client 202 (steps 242-246) without leaking any information to the client 202 regarding the order of the entity identifiers.

The client 202 encrypts the client-derived decryption keys to obtain client-encrypted/client-derived decryption keys (248). After generating the set of client-derived decryption keys in step 226 of the process 200, the client 202 encrypts each of the client-derived decryption keys in the set of client-derived decryption keys to generate a set of client-encrypted/client-derived decryption keys. In other words, the client 202 adds a layer of encryption on each of the client-derived decryption keys. As used throughout this specification, the phrase "client-encrypted/client-derived decryption keys" refers to client-derived decryption keys that are encrypted by the client, but not encrypted by the server.

The client 202 transmits the client-encrypted/client-derived decryption keys to the server 204 (250). For example, after encrypting each of the client-derived decryption keys in the set of client-derived decryption keys, the client 202 transmits the set of the client-encrypted/client-derived decryption keys to the server 204 over the network 102. In turn, the server 205 receives, from the client 202, the set of client-encrypted/client-derived decryption keys that (i) were derived by the client device independent of the set of server-encrypted decryption keys, and (ii) are encrypted by the client device.

The server encrypts the client-encrypted/client-derived decryption keys (252). In some implementations, the server 204 after receiving the set of client-encrypted/client-derived decryption keys, encrypted each of the client-encrypted/client-derived decryption key in the set to generate a corresponding server-client-encrypted/client-derived decryption key. In other words, the server 204 adds a layer of encryption on each of the client-encrypted/client-derived decryption keys.

The server 204 filters the client-encrypted queries (254). In some implementations, the server 204 compares the set of server-client-encrypted/client-derived decryption keys and the set of client-server-encrypted decryption keys to identify encrypted decryption keys that are present in both the set of server-client-encrypted/client-derived decryption keys and in the set of client-server-encrypted decryption keys. Note that the set of server-client-encrypted/client-derived decryption keys are associated with the set of client-encrypted queries generated by the client 202 based on the M*N identifiers of the matrix P and the set of set of client-server-encrypted decryption keys are associated with the key-value pairs that are present in the server database.

To implement the step 254, the server 202 can generate an indicator matrix of dimension M×N where each element of the indicator matrix is either 0 or 1. For e.g., an element in the indicator matrix has a value 1 if the element is a matching decryption key. If the element is not a matching decryption key its value is set as 0.

In some implementations, the server 202 can filter valid queries from the set of client-encrypted queries based on the indicator matrix (or the matching decryption keys), which can also be referred to as a matching decryption key map. Recall that the set of client-encrypted queries were generated by the client 202 based on the matrix P of dimension M×N where M is the number of entities and N is the number of entity identifiers where each entity identifier was server encrypted after the client 202 removed the prior client encryption in step 222 of the process 200. Further recall that the client 202 generated client-encrypted queries for each server-encrypted identifier resulting in a total of M*N client-encrypted queries. To filter the valid queries from the set of client-encrypted queries, the server 204 selects client-encrypted queries for which the corresponding element of the indicator matrix has a value 1. In other words, the server 204 selects queries from the set of client-encrypted queries for which the corresponding client-server-encrypted decryption key is a matching decryption key. For the remaining client-encrypted queries for which the corresponding element in the indicator matrix has a value 0 is not selected.

The server 204 selects client-encrypted queries that have the best match in the server database (256). As mentioned before, the client 202 can assign multiple entity identifiers to each of the one or more entities. For example, the client 202 has M users and to each of the M users, the client 202 assigns N entity identifiers. The server 204 after receiving the multiple client-encrypted queries selects data based on the query that is the best match in the server database. The query selection can be performed using a filter that for example, the server can select content corresponding to an entity identifier that has been assigned the highest priority and/or order.

Since the process 200 assumes that the N entity identifiers are in an order (from 1 to N) and that the server 204 can select content based on that order, the server 202 can select the client-encrypted queries using the same order. For example, a particular user from among the M users is assigned N entity identifiers and a corresponding binary vector in the indicator matrix. In this example, the server 204 will select a single client-encrypted query that is based on an entity identifier whose corresponding value in the binary vector is 1 and is simultaneously the first occurrence of 1 in the binary vector. This logic implemented by the server 204 allows the selected query to be both valid and according to the order of the entity identifiers that was pre-specified by both the client 202 and the server 204.

The server 204 executes the filtered client-encrypted queries on the server database (258). After filtering the queries that are valid and are in accordance to the order of the entity identifiers, the server 204 can execute the queries on the server encrypted database to retrieve content. The server 204 uses the process 400 (explained with reference to step 236 of the process 200) to identify shards using the shard-index of the query and then query each bucket in the shard to generate a list of FHE encrypted values that were selected using the absorption operations performed by the server 204.

The server 204 transmits the list of FHE encrypted values to the client 202 (260). The server 204 after generating the list of FHE encrypted values of the bucket vector and the c-byte chunks for each of the filtered queries, transmits the one or more lists to the client 202 over the network 102.

The client 202 decrypts the FHE encryption using the client-derived decryption keys (262). In some implementations, after receiving the lists of FHE encrypted values of the bucket vector and the c-byte chunks for each of the queries transmitted by the client 202, the client can use the decryption keys that were generated in step 226 of the process 200 to decrypt the FHE encryption to obtain the value of the key-value pair that was queried and was originally stored on the server database.

Figure 3:
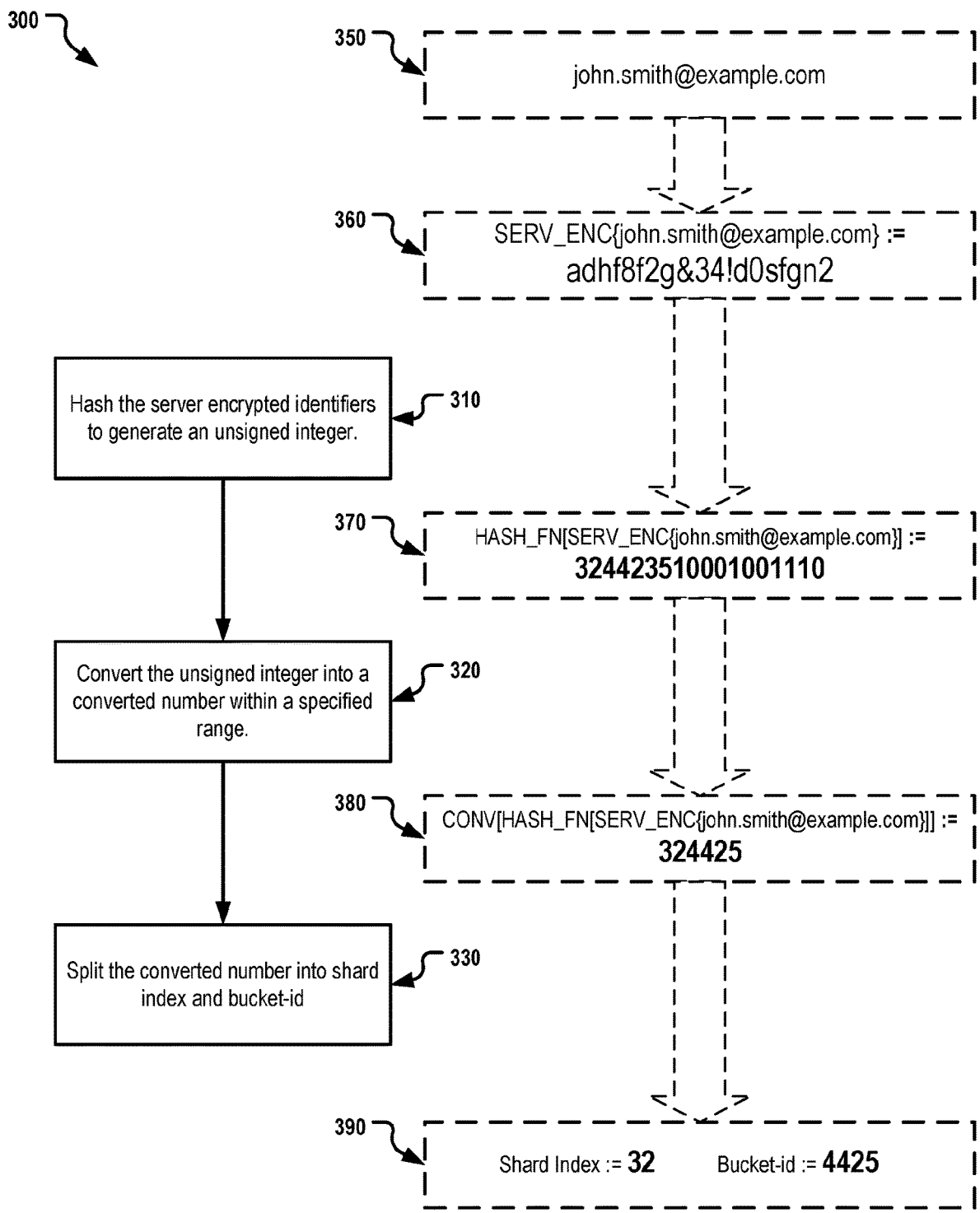
FIG. 3 is a flow diagram of an example process of generating a query from server encrypted identifiers.

FIG. 3 is a flow diagram of an example process 300 of generating a query from the server-encrypted identifiers. The process 300 is described with reference to a single identifier, but can be performed on multiple identifiers. Operations of the process 300 can be implemented, for example, by the client 202 or any entity that implements the techniques described in this document to retrieve content from another entity. Operations of the process 300 can also be implemented as instructions stored on one or more computer readable media, which may be non-transitory, and execution of the instructions by one or more data processing apparatus can cause the one or more data processing apparatus to perform the operations of the process 300.

FIG. 3 explains the process 300 of generating a query using an example identifier 350 (john.smith@example.com). After processing the identifier 350 using step 222 of the process 200, the server encrypted identifier 360 representing the identifier 350 is represented as SERV_ENC{john.smith@example.com}:=adhf8f2g&34!d0sfgn2 where SERV_ENC is the server encryption of the identifier 350 after the client 202 removes the client encryption that was added in step 214 and "adhf8f2g&34!d0sfgn2" represents the ciphertext of the server-encrypted identifier 350.

The client 202 hashes the server-encrypted identifier to generate an unsigned integer (310). In some implementations, the client 202 can implement a hash function that is configured to process the server-encrypted identifier 360 to generate an unsigned integer 370. This can be represented as HASH_FN[SERV_ENC{john.smith@example.com}]:=324423510001001110 where HASH_FN is the hash function implemented by the client 202 and "3244235100-01001110" is the unsigned integer. The hash function (also referred to as a Cryptographic Hash Function) can be any one-way function which is practically infeasible to invert or reverse and that can be used to map data of arbitrary size to a fixed-size value. Examples of such hash functions can include MD5 message-digest algorithm, Secure Hash Algorithm 1, 2 and 3.

The client 202 converts the unsigned integer into a converted number that is within a specified range (320). In some implementations, the client 202 can implement a conversion function that is configured to process the unsigned integer 370 to generate a converted number 380 that is within a specified range. Since the hash function and the conversion function are known to both the client 202 and the server 204, the range of the converted number generated using the conversion function is pre-specified. In this example, the converted number 380 is represented as CONV [HASH_FN[SERV_ENC{john.smith@example.com}]]:=324425 where CONV is the conversion function implemented by the client 202. As an example, one way to convert an unsigned integer into a number between 0 and 9999 is to use the remainder of the unsigned integer divided by 10000.

The client 202 splits the converted number into a shard index and a bucket-id (330). The shard index will be a number between 0 and P−1, where P is the number of shards. The bucket-id will range between 0 and n/P−1, where n is the largest value that the converted number 380 generated in step 320 can take. In some implementations, the client 202 splits the converted number 380 generated in step 320 into two parts such that the first part is the shard index and the second part is the bucket-id. For example, if n is the largest value that the converted number 380 can take, the number of bits required to represent the number n is log 2n bits. In such a scenario, if P is a power of 2 where P=2→K, the client 202 can use the first K bits as the shard index and the remaining, log_2 n-K bits can be used as a bucket-id. In this example, the client 202 splits the converted number 380 into two parts as depicted in FIG. 3 as result 390 such that the shard index is 32 and the bucket-id is 4425. In another implementation, if P represents the number of shards, the shard index can be computed as the remainder when the converted number is divided by P. In this case, the bucket-id can be computed as the integer quotient when the converted number is divided by P. In this case, if P=100 then shard index 25 and bucket-id 3244.

Figure 4:
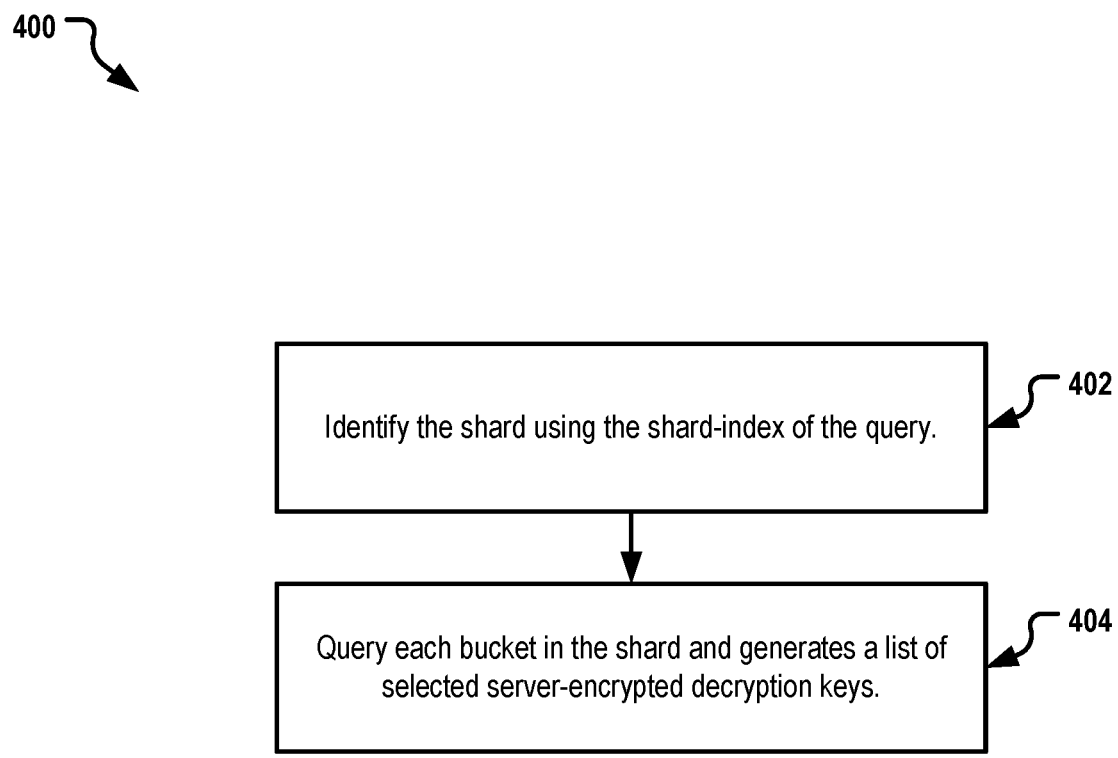
FIG. 4 is a flow diagram of an example process of processing queries by a server.

FIG. 4 is a flow diagram of an example process 400 of processing queries to retrieve the set of server-encrypted decryption keys from the server encrypted database. Operations of the process 400 can be implemented, for example, by the server 204 or any entity that implements a database from where content is being retrieved. Operations of the process 400 can also be implemented as instructions stored on one or more computer readable media which may be non-transitory, and execution of the instructions by one or more data processing apparatus can cause the one or more data processing apparatus to perform the operations of the process 400.

For each query, the server 204 identifies the shard in the server encrypted database using the shard-index of the query (402). As mentioned before with reference to step 224-228 of the process 200, each query includes a shard index and a corresponding FHE encrypted bucket vector. After receiving a query, the server 204 identifies a particular shard based on the shard index of the query. For example, if the shard index of the query is 32, the server identifies the 32nd shard based on the shard indexes of the server encrypted database. Furthermore, the system can be designed so that each of the shards is selected the exact same number of times to prevent any information about the queries from being gleaned based on the shards queried.

For each query, the server 204 queries each bucket in the shard and generates a set of server-encrypted decryption keys (404). In some implementations, the server can create the set of server-encrypted decryption keys based on database bucket identifiers included in the client-encrypted queries, such that the set of server-encrypted decryption keys includes the server-encrypted decryption key for each database entry corresponding to the bucket identifiers included in the client-encrypted queries. In some implementations, the server 204 queries each bucket of the particular shard identified by the shard index using the FHE encrypted bucket vector from the query. For example, if there are 32 buckets in a shard that was identified using the shard-index from the query, the server 204 will query each of the 32 buckets.

There are a variety of ways that buckets can be queried, and any appropriate bucket querying technique can be used. For example, the server 204 performs an oblivious expansion operation on the FHE encrypted bucket vector from the query to obtain an FHE encrypted value for the particular bucket. Then it performs a separate FHE absorption operation between the FHE encrypted value for the particular bucket and each c-byte chunk in the bucket. This can be logically explained with the following non-limiting example.

For purposes of example, assume that there are 4 buckets in the particular shard. Further assume that the 1st bucket has the following chunks ["A", "B", "C", "D"]. Similarly the 2nd, the 3rd and the 4th bucket has the following chunks ["E", "F", "G"], ["H"] and ["I", "J", "K"] respectively. Further assume that the indicator vector is [0, 1, 0, 0]. An absorption operation will generate server-encrypted decryption keys of chunks with index 1 across all four buckets that can be represented as [0, "E", 0, 0]. Similarly FHE encrypted values of chunks with indices 2-4 across all four buckets are [0, "F", 0, 0], [0, "G", 0, 0] and [0, 0, 0, 0] respectively.

In some implementations, the server 204 can aggregate the values of the server-encrypted decryption keys of the bucket vector and the c-byte chunks using the FHE addition operation across all buckets and generate a set of server-encrypted decryption keys. In other words, all entries in the set of triples described previously with the same query and chunk_index are combined into one by summing the server-encrypted decryption keys. For example, the aggregation operation on the values of the server-encrypted decryption keys of the bucket vector and the c-byte chucks with a particular index, for example, index 1 will select the chunk "E" from among all chunks having index 1 across all four buckets of the shard. Similarly, the aggregated values of the chunks at the 2nd, the 3rd and the 4th indices are "F","G" and 0 respectively across all buckets of the shard. The server 204, after selecting the chunks from buckets, can generate a set server-encrypted decryption keys and transmits the set to the client 202. For example, the server can generate a set ["E", "F", "G" ] of server-encrypted decryption keys that were selected using the absorption operation and transmit the set to the client 202.

The process 400 is implemented in a way that multiple queries are processed in parallel on multiple computing systems. In some implementations, a map reduce process can be used that enables all queries to be processed as a batch of queries, which reduces the time required to generate a response to the queries, and saves processing resources relative to processing each query individually. For example, assume that the database is partitioned into n buckets by hashing keys and that the buckets are partitioned into shards based on leading k bits. In this example, the server can partition the queries by shard based on the provided shard index that is submitted with each query. The server can then fan out each query to a server-encrypted decryption keys bucket in its shard by decompressing the encrypted bucket selector. Within each shard, each bucket is joined with the server-encrypted decryption keys from the queries for the bucket. For each bucket: for each pair in the cartesian product of server-encrypted decryption keys from queries and chunks of the bucket, perform an FHE absorption. The output of this step is a multimap from (query_id, chunk_index) pairs to server-encrypted decryption key. The values are aggregated using FHE addition as the aggregator. This has the same output format as the previous step, except that it's not a multimap—each key has exactly one server-encrypted decryption key. A set of server-encrypted decryption keys sorted by chunk_index is aggregated, and the output format is a map from query to a set of server-encrypted decryption keys. By providing the same number of queries per shard and with appropriate sharding, the computational costs can be reduced by having many shards without revealing any information about the distribution of queries.

The client 202 only queries a subset of values of the key-value pairs stored in the server database. The server 204 in order to select a set of decryption keys associated to the key-value pairs and the client-encrypted queries executes the queries on the server encrypted database to filter out decryption keys that are not associated to other key-value pairs of the server database. In other words the server 204 selects server-encrypted decryption keys corresponding to the client-encrypted queries.

Figure 5:
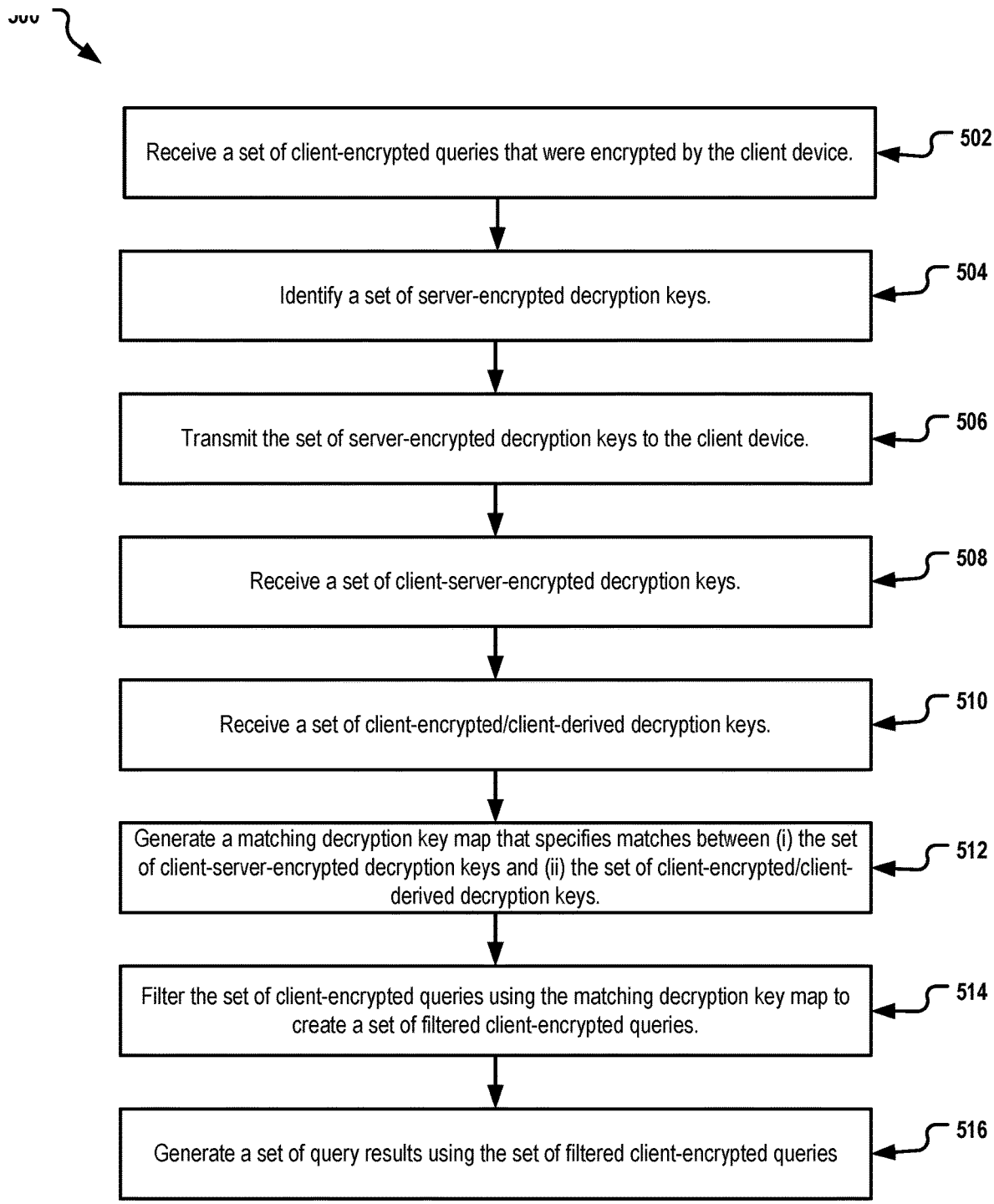
FIG. 5 is a flow diagram of an example process performed by the server to provide content to the client.

FIG. 5 is a flow diagram of an example process 500 to provide data in response to a client query. Operations of process 500 are described below as being performed by the server 202. Operations of the process 500 are described below for illustration purposes only. Operations of the process 500 can be performed by any appropriate device or system, e.g., any appropriate data processing apparatus. Operations of the process 500 can also be implemented as instructions stored on a non-transitory computer readable medium. Execution of the instructions causes one or more data processing apparatus to perform operations of the process 500.

The server 204 receives a set of client-encrypted queries that were encrypted by the client device (502). The client 202 can uniquely identify one or more entities by assigning one or more entity identifiers to each of the one or more entities. The client 202 can maintain the entity identifiers as a matrix (referred to as a matrix P) of dimension M×N where M is the number of entities and N is the number of entity identifiers.

As previously discussed, to prevent the server 204 from accessing the entity identifiers in plaintext, the client 202 encrypts the entity identifiers of the matrix P using a deterministic and commutative encryption technique to generate an encrypted form of the entity identifiers (referred to as "client-encrypted identifiers") and transmits the client-encrypted identifiers to the server 204. After receiving the client-encrypted identifiers, the server 204 re-encrypts the client-encrypted identifiers using a commutative encryption technique to generate an encrypted form of the client encrypted identifiers (referred to as "server-client-encrypted identifiers") and transmits them back to the client 202.

In some implementations, the server 204 can also shuffle the set of sever-client-encrypted identifiers before transmitting them back to the client 202. This shuffling results in a set of shuffled server-client-encrypted identifiers that has a different ordering than the set of server-client-encrypted identifiers, which prevents the client from being able to identify which of the server-client-encrypted identifiers corresponds to the client-encrypted identifiers originally submitted to the server 204. In these implementations, the server 204 transmits the shuffled server-client-encrypted identifiers to the client device 202. Furthermore, when the server performs the shuffling, the server will receive a set of shuffled client-encrypted queries that were generated using the set of shuffled server-client-encrypted identifiers because the queries will be generated by the client using the shuffled server-client-encrypted identifiers.

After receiving the server-client-encrypted identifiers, the client 202 uses techniques to decrypt (or remove) the encryption that was performed by the client 202 in step 214 to generate "server-encrypted identifiers" from each of the server-client-encrypted identifiers. The client 202 generates a shard index and a bucket identifier for each server encrypted identifiers by implementing a hashing technique (explained with reference to the FIG. 3 and the process 300) to generate a query that can include a shard index and a bucket identifier (also referred to as a bucket-id). The client 202 generates queries for each of the M*N server-client-encrypted identifiers that is referred to as a set of client-encrypted queries. The client 202 then transmits the set of client-encrypted queries to the server 204.

The server 204 identifies a set of server-encrypted decryption keys (504). As discussed above, the server 202 can generate decryption keys for each of value of the key-value pairs in the server database that was encrypted using an encryption technique such as an AES. The server 204 can maintain the server-encrypted decryption keys by creating a database (referred to as a server encrypted database) that stores the server-encrypted decryption keys. The server 204 partitions the server encrypted database into shards and the shards into buckets. To identify the set of server-encrypted decryption keys, the server 204 executes each of the M*N client-encrypted queries on the server encrypted database using the process 400 to generate a set of server-encrypted decryption keys.

The server 204 transmits the set of server-encrypted decryption keys to the client 202 (506). For example, after generating a set of server-encrypted decryption keys, the server 204 shuffles the M*N server-encrypted decryption keys in the set of server-encrypted decryption keys. The server 204 transmits the set of shuffled server-encrypted decryption keys to the client 202 over the network 102.

The server 204 receives a set of client-server-encrypted decryption keys (508). As discussed above, after receiving the set of server-encrypted decryption keys from the server 204, the client 202 re-encrypts (e.g., further encrypts) the M*N server-encrypted decryption keys in the set of server-encrypted decryption keys using a commutative encryption technique to generate a set of client-server-encrypted decryption keys. The client 202 transmits the set of client-server-encrypted decryption keys to the server 204 over the network 102. The server 204 receives a set of client-encrypted/client-derived decryption keys (510). For example, after generating the set of client-derived decryption keys in step 226 of the process 200, the client 202 encrypts each of the client-derived decryption keys in the set of client-derived decryption keys using a commutative encryption technique to generate a set of client-encrypted/client-derived decryption keys. After encrypting each of the client-derived decryption keys in the set of client-derived decryption keys, the client 202 transmits the set of the client-encrypted/client-derived decryption keys over the network 102, and the client-encrypted/client-derived decryption keys are received by the server 204. If the server has shuffled the set of sever-client-encrypted identifiers, as discussed above, then the decryption keys generated by the client (i.e., the client-derived decryption keys) will be shuffled. In these situations, the server 204 will receive a shuffled set of client-encrypted/client-derived decryption keys that (i) were derived by the client device using the shuffled server-client-encrypted identifiers, and (ii) are encrypted by the client device. In turn, the server 204 can remove the shuffling.

The server generates a matching decryption key map that specifies matches between (i) the set of client-server-encrypted decryption keys and (ii) the set of client-encrypted/client-derived decryption keys (512). After receiving the set of client-server-encrypted decryption keys, the server 204 uses techniques to decrypt (or remove) the encryption that was performed by the server 204 in step 242 to generate "client-encrypted decryption keys" for each of the M*N client-server-encrypted decryption keys.

In situations where the server 204 shuffled the decryption keys, the server 204, after generating the M*N server-encrypted decryption keys, unshuffles the server-encrypted decryption keys to nullify the shuffling performed by the server in optional step 238 of the process 200. The server 204 compares the set of client-encrypted/client-derived decryption keys and the set of client-encrypted decryption keys to identify client-encrypted decryption keys that are present in both the set of client-encrypted/client-derived decryption keys and in the set of client-encrypted decryption keys. The server 202 can generate an indicator matrix of dimension M×N where each element of the indicator matrix is either 0 or 1. For e.g., an element in the indicator matrix has a value 1 if the element is a matching decryption key. If the element is not a matching decryption key its value is set as 0.

As used throughout this specification, the phrase "matching decryption key map" refers to any representation of the set of matching decryption keys that are identified by comparing the client-encrypted/client-derived decryption keys to the client-encrypted decryption keys irrespective of the form of that representation. The matching decryption key map specifies matches between (i) the set of client-server-encrypted decryption keys and (ii) the set of client-encrypted/client-derived decryption keys.

In some implementations, generating the matching decryption key map can include removing, by the server, the server encryption from the set of client-server-encrypted decryption keys resulting in a recovered set of client-encrypted decryption keys. The recovered set of client-encrypted decryption keys includes client-encrypted versions of each corresponding decryption key for each database entry corresponding to the bucket identifiers included in the client-encrypted queries. The generation of the matching decryption key map can also include comparing, by the server, the recovered set of client-encrypted decryption keys to the set of client-encrypted/client-derived decryption keys, and creating, based on the comparing, an indication of matching client-encrypted decryption keys that are included in both of the recovered set of client-encrypted decryption keys to the set of client-encrypted/client-derived decryption keys.

The server 204 filters the client-encrypted queries using the matching decryption key map to create a set of filtered client-encrypted queries (514). The server 202 can filter valid queries from the set of client-encrypted queries based on the indicator matrix (or the matching decryption keys). To filter the valid queries from the set of client-encrypted queries, the server 204 selects client-encrypted queries for which the corresponding element of the indicator matrix has a value 1. In other words, the server 204 selects queries from the set of client-encrypted queries for which the corresponding client-encrypted decryption key is a matching decryption key. For the remaining client-encrypted queries for which the corresponding element in the indicator matrix has a value 0 is not selected. In some implementations, the filtering of the set of client-encrypted queries is performed by removing, from the client-encrypted queries, those queries having bucket identifiers for database entries corresponding to the recovered set of client-encrypted decryption keys that are not matched by any of the client-encrypted/client-derived decryption keys.

The server 204, after receiving the multiple client-encrypted queries, selects data based on the query that is the best match in the server database. For example, the server can select content corresponding to an entity identifier that has been assigned the highest priority and/or order. For example, a particular user from among the M users is assigned N entity identifiers and a corresponding binary vector in the indicator matrix. The server 204 will select a single client-encrypted query that is based on an entity identifier whose corresponding value in the binary vector is 1 and is simultaneously the first occurrence of 1 in the binary vector. In some situations, that will be the most well-defined query that is matched, as previously discussed. This logic implemented by the server 204 allows the selected query to be both valid and according to the order of the entity identifiers that was pre-specified by both the client 202 and the server 204.

The server 204 generates a set of query results using the set of filtered client-encrypted queries (516). After filtering the queries that are valid and are in accordance to the order of the entity identifiers, the server 204 can execute the queries on the server database to retrieve content. The server 204 uses the process 400 (explained with reference to step 236 of the process 200) to identify shards using the shard-index of the query and then query each bucket in the shard to generate a list of FHE encrypted values that were selected using the absorption operations performed by the server 204. Of course, the queries could be executed and the results filtered instead of filtering the queries, but that would require more processing, such that filtering the queries prior to execution of the queries leads to a more efficient information retrieval process.

Figure 6:
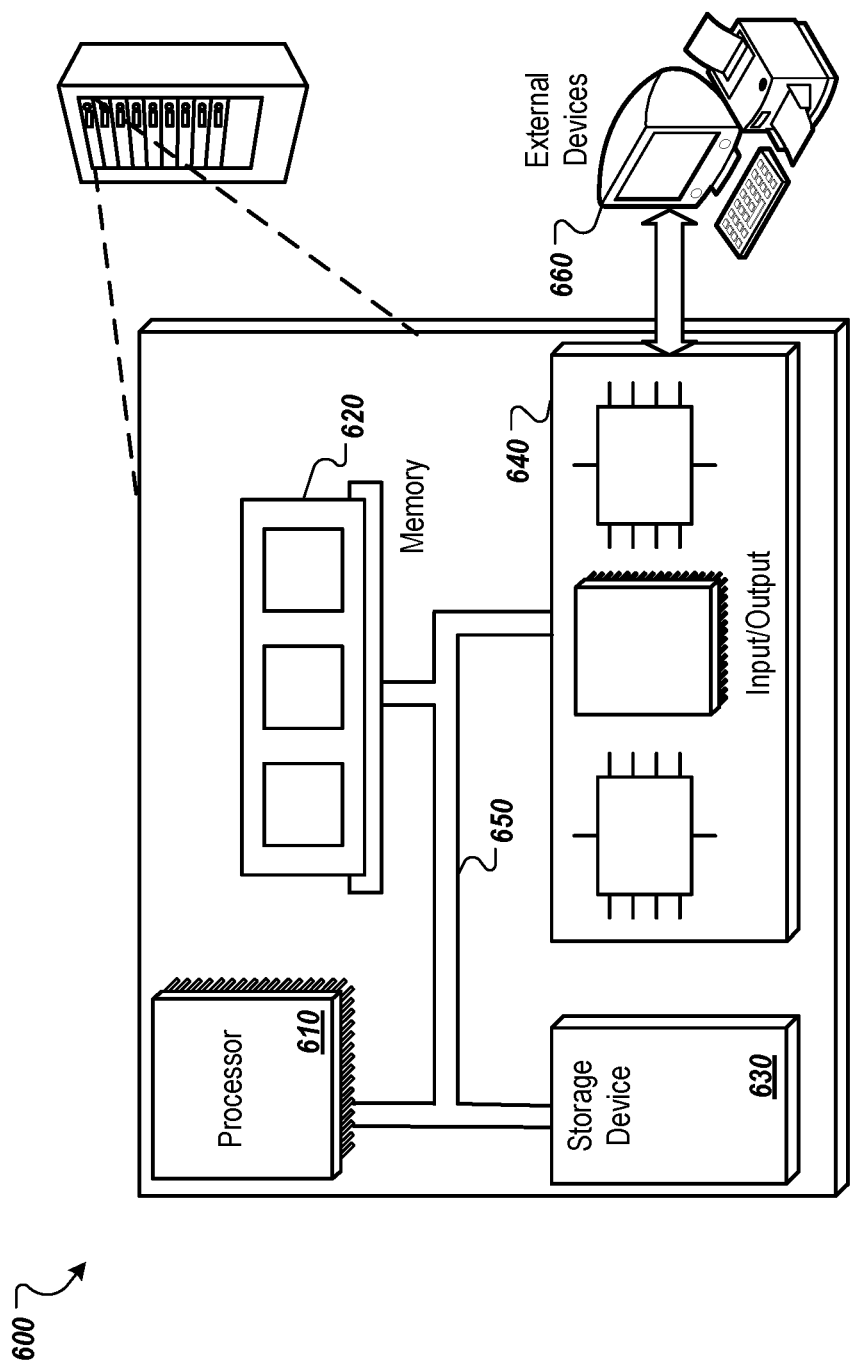
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a server including one or more processors and from a client device, a set of client-encrypted queries that were encrypted by the client device;
identifying, by the server, a set of server-encrypted decryption keys based on the set of client-encrypted queries;
transmitting, by the server, the set of server-encrypted decryption keys to the client device;
receiving, by the server and from the client device, a set of client-server-encrypted decryption keys that includes the set of server-encrypted decryption keys that have been further encrypted by the client device;
receiving, by the server and from the client device, a set of client-encrypted/client-derived decryption keys that (i) were derived by the client device independent of the set of server-encrypted decryption keys, and (ii) are encrypted by the client device;
generating, by the server, a matching decryption key map that specifies matches between (i) the set of client-server-encrypted decryption keys and (ii) the set of client-encrypted/client-derived decryption keys;
filtering, by the server, the set of client-encrypted queries using the matching decryption key map to create a set of filtered client-encrypted queries; and
generating, by the server, a set of query results using the set of filtered client-encrypted queries.

2. The computer-implemented method of claim 1, further comprising:
receiving, from the client device, a set of client-encrypted entity identifiers;
encrypting, by the server, the set of client-encrypted entity identifiers to create a set of sever-client-encrypted identifiers;
transmitting, by the server, the set of server-client-encrypted identifiers to the client device.

3. The computer-implemented method of claim 2, further comprising:
generating, by the client device, a set of queries using the set of server-client-encrypted identifiers;
generating, by the client device, a set of decryption keys using the set of server-client-encrypted identifiers;
encrypting, by the client device, the set of queries to create the client-encrypted queries.

4. The computer-implemented method of claim 3, further comprising:
encrypting, by the server, a set of data stored in a database, wherein, for a plurality of entries in the database, each database entry is server-encrypted and is capable of being decrypted by a corresponding decryption key;
encrypting, by the server, each corresponding decryption key for the plurality of entries in the database;
creating, by the server, the set of server-encrypted decryption keys based on database bucket identifiers included in the client-encrypted queries, wherein the set of server-encrypted decryption keys includes the server-encrypted decryption key for each database entry corresponding to the bucket identifiers included in the client-encrypted queries.

5. The computer-implemented method of claim 4, wherein generating a matching decryption key map comprises:
removing, by the server, the server encryption from the set of client-server-encrypted decryption keys resulting in a recovered set of client-encrypted decryption keys that includes client-encrypted versions of each corresponding decryption key for each database entry corresponding to the bucket identifiers included in the client-encrypted queries;
comparing, by the server, the recovered set of client-encrypted decryption keys to the set of client-encrypted/client-derived decryption keys; and
creating, based on the comparing, an indication of matching client-encrypted decryption keys that are included in both of the recovered set of client-encrypted decryption keys to the set of client-encrypted/client-derived decryption keys, wherein:
filtering the set of client-encrypted queries comprises removing, from the client-encrypted queries, queries having bucket identifiers for database entries corresponding to the recovered set of client-encrypted decryption keys that are not matched by any of the client-encrypted/client-derived decryption keys.

6. The computer-implemented method of claim 3, further comprising:
shuffling, by the server, the set of sever-client-encrypted identifiers resulting in a set of shuffled server-client-encrypted identifiers that has a different ordering than the set of server-client-encrypted identifiers, wherein:
transmitting the set of server-client-encrypted identifiers to the client device comprises transmitting the shuffled server-client-encrypted identifiers to the client device; and
receiving a set of client-encrypted queries that were encrypted by the client device comprises receiving a set of shuffled client-encrypted queries that were generated using the set of shuffled server-client-encrypted identifiers.

7. The computer-implemented method of claim 6, wherein receiving a set of client-encrypted/client-derived decryption keys comprises receiving a shuffled set of client-encrypted/client-derived decryption keys that (i) were derived by the client device using the shuffled server-client-encrypted identifiers, and (ii) are encrypted by the client device.

8. A system, comprising:
a server including a memory device and one or more processors, wherein the server is configured to execute instructions that cause the server to perform operations comprising:
receiving, by the server and from a client device, a set of client-encrypted queries that were encrypted by the client device;
identifying, by the server, a set of server-encrypted decryption keys based on the set of client-encrypted queries;
transmitting, by the server, the set of server-encrypted decryption keys to the client device;
receiving, by the server and from the client device, a set of client-server-encrypted decryption keys that includes the set of server-encrypted decryption keys that have been further encrypted by the client device;
receiving, by the server and from the client device, a set of client-encrypted/client-derived decryption keys that (i) were derived by the client device independent of the set of server-encrypted decryption keys, and (ii) are encrypted by the client device;
generating, by the server, a matching decryption key map that specifies matches between (i) the set of client-server-encrypted decryption keys and (ii) the set of client-encrypted/client-derived decryption keys;
filtering, by the server, the set of client-encrypted queries using the matching decryption key map to create a set of filtered client-encrypted queries; and
generating, by the server, a set of query results using the set of filtered client-encrypted queries.

9. The system of claim 8, wherein the instructions cause the server to perform operations further comprising:
receiving, from the client device, a set of client-encrypted entity identifiers;
encrypting, by the server, the set of client-encrypted entity identifiers to create a set of sever-client-encrypted identifiers;
transmitting, by the server, the set of server-client-encrypted identifiers to the client device.

10. The system of claim 9, wherein the client device is configured to perform operations further comprising:
generating, by the client device, a set of queries using the set of server-client-encrypted identifiers;
generating, by the client device, a set of decryption keys using the set of server-client-encrypted identifiers;
encrypting, by the client device, the set of queries to create the client-encrypted queries.

11. The system of claim 10, wherein the instructions cause the server to perform operations further comprising:
encrypting, by the server, a set of data stored in a database, wherein, for a plurality of entries in the database, each database entry is server-encrypted and is capable of being decrypted by a corresponding decryption key;
encrypting, by the server, each corresponding decryption key for the plurality of entries in the database;
creating, by the server, the set of server-encrypted decryption keys based on database bucket identifiers included in the client-encrypted queries, wherein the set of server-encrypted decryption keys includes the server-encrypted decryption key for each database entry corresponding to the bucket identifiers included in the client-encrypted queries.

12. The system of claim 11, wherein generating a matching decryption key map comprises:
removing, by the server, the server encryption from the set of client-server-encrypted decryption keys resulting in a recovered set of client-encrypted decryption keys that includes client-encrypted versions of each corresponding decryption key for each database entry corresponding to the bucket identifiers included in the client-encrypted queries;
comparing, by the server, the recovered set of client-encrypted decryption keys to the set of client-encrypted/client-derived decryption keys; and
creating, based on the comparing, an indication of matching client-encrypted decryption keys that are included in both of the recovered set of client-encrypted decryption keys to the set of client-encrypted/client-derived decryption keys, wherein:
filtering the set of client-encrypted queries comprises removing, from the client-encrypted queries, queries having bucket identifiers for database entries corresponding to the recovered set of client-encrypted decryption keys that are not matched by any of the client-encrypted/client-derived decryption keys.

13. The system of claim 10, wherein the instructions cause the server to perform operations further comprising:
shuffling, by the server, the set of sever-client-encrypted identifiers resulting in a set of shuffled server-client-encrypted identifiers that has a different ordering than the set of server-client-encrypted identifiers, wherein:
transmitting the set of server-client-encrypted identifiers to the client device comprises transmitting the shuffled server-client-encrypted identifiers to the client device; and
receiving a set of client-encrypted queries that were encrypted by the client device comprises receiving a set of shuffled client-encrypted queries that were generated using the set of shuffled server-client-encrypted identifiers.

14. The system of claim 13, wherein receiving a set of client-encrypted/client-derived decryption keys comprises receiving a shuffled set of client-encrypted/client-derived decryption keys that (i) were derived by the client device using the shuffled server-client-encrypted identifiers, and (ii) are encrypted by the client device.

15. A non-transitory computer readable medium storing instructions that, when executed by one or more data processing apparatus, cause the one or more data processing apparatus to perform operations comprising:
  receiving, by a server including one or more processors and from a client device, a set of client-encrypted queries that were encrypted by the client device;
  identifying, by the server, a set of server-encrypted decryption keys based on the set of client-encrypted queries;
  transmitting, by the server, the set of server-encrypted decryption keys to the client device;
  receiving, by the server and from the client device, a set of client-server-encrypted decryption keys that includes the set of server-encrypted decryption keys that have been further encrypted by the client device;
  receiving, by the server and from the client device, a set of client-encrypted/client-derived decryption keys that (i) were derived by the client device independent of the set of server-encrypted decryption keys, and (ii) are encrypted by the client device;
  generating, by the server, a matching decryption key map that specifies matches between (i) the set of client-server-encrypted decryption keys and (ii) the set of client-encrypted/client-derived decryption keys;
  filtering, by the server, the set of client-encrypted queries using the matching decryption key map to create a set of filtered client-encrypted queries; and
  generating, by the server, a set of query results using the set of filtered client-encrypted queries.

16. The non-transitory computer readable medium of claim 15, further comprising:
  receiving, from the client device, a set of client-encrypted entity identifiers;
  encrypting, by the server, the set of client-encrypted entity identifiers to create a set of sever-client-encrypted identifiers;
  transmitting, by the server, the set of server-client-encrypted identifiers to the client device.

17. The non-transitory computer readable medium of claim 16, further comprising:
  generating, by the client device, a set of queries using the set of server-client-encrypted identifiers;
  generating, by the client device, a set of decryption keys using the set of server-client-encrypted identifiers;
  encrypting, by the client device, the set of queries to create the client-encrypted queries.

18. The non-transitory computer readable medium of claim 17, further comprising:
  encrypting, by the server, a set of data stored in a database, wherein, for a plurality of entries in the database, each database entry is server-encrypted and is capable of being decrypted by a corresponding decryption key;
  encrypting, by the server, each corresponding decryption key for the plurality of entries in the database;
  creating, by the server, the set of server-encrypted decryption keys based on database bucket identifiers included in the client-encrypted queries, wherein the set of server-encrypted decryption keys includes the server-encrypted decryption key for each database entry corresponding to the bucket identifiers included in the client-encrypted queries.

19. The non-transitory computer readable medium of claim 18, wherein generating a matching decryption key map comprises:
  removing, by the server, the server encryption from the set of client-server-encrypted decryption keys resulting in a recovered set of client-encrypted decryption keys that includes client-encrypted versions of each corresponding decryption key for each database entry corresponding to the bucket identifiers included in the client-encrypted queries;
  comparing, by the server, the recovered set of client-encrypted decryption keys to the set of client-encrypted/client-derived decryption keys; and
  creating, based on the comparing, an indication of matching client-encrypted decryption keys that are included in both of the recovered set of client-encrypted decryption keys to the set of client-encrypted/client-derived decryption keys, wherein:
    filtering the set of client-encrypted queries comprises removing, from the client-encrypted queries, queries having bucket identifiers for database entries corresponding to the recovered set of client-encrypted decryption keys that are not matched by any of the client-encrypted/client-derived decryption keys.

20. The non-transitory computer readable medium of claim 17, further comprising:
  shuffling, by the server, the set of sever-client-encrypted identifiers resulting in a set of shuffled server-client-encrypted identifiers that has a different ordering than the set of server-client-encrypted identifiers, wherein:
  transmitting the set of server-client-encrypted identifiers to the client device comprises transmitting the shuffled server-client-encrypted identifiers to the client device; and
  receiving a set of client-encrypted queries that were encrypted by the client device comprises receiving a set of shuffled client-encrypted queries that were generated using the set of shuffled server-client-encrypted identifiers.

* * * * *